(12) United States Patent
Davis et al.

(10) Patent No.: US 8,800,868 B1
(45) Date of Patent: Aug. 12, 2014

(54) CREDIT CARD PROCESSING FOR A VEHICLE FLEET

(75) Inventors: Jesse H. Davis, Demarest, NY (US); John J. Backof, II, Hockessin, DE (US)

(73) Assignee: Creative Mobile Technologies, LLC, Long Island City, NY (US)

(*) Notice: Subject to any disclaimer, the term of this patent is extended or adjusted under 35 U.S.C. 154(b) by 939 days.

(21) Appl. No.: 12/171,359

(22) Filed: Jul. 11, 2008

(51) Int. Cl.
*G07B 15/02* (2011.01)

(52) U.S. Cl.
USPC .......................................... 235/384; 235/380

(58) Field of Classification Search
USPC ............................................ 235/379; 705/28
See application file for complete search history.

(56) References Cited

U.S. PATENT DOCUMENTS

| | | | |
|---|---|---|---|
| 5,991,410 A * | 11/1999 | Albert et al. .................... | 705/78 |
| 6,339,745 B1 * | 1/2002 | Novik ............................ | 701/208 |
| 6,347,739 B1 * | 2/2002 | Tamam .......................... | 235/384 |
| 6,502,030 B2 | 12/2002 | Hilleary ......................... | 701/207 |
| 6,736,317 B1 | 5/2004 | McDonald et al. ............ | 235/384 |
| 7,353,208 B1 | 4/2008 | Stambaugh ..................... | 705/59 |
| 2002/0156727 A1 * | 10/2002 | LeVake et al. ................. | 705/39 |
| 2008/0021821 A1 * | 1/2008 | Katyal et al. .................... | 705/40 |

* cited by examiner

*Primary Examiner* — Christopher Stanford
(74) *Attorney, Agent, or Firm* — Klintworth & Rozenblat IP LLC (57) ABSTRACT

Credit card transactions are processed and managed for a fleet of motor vehicles for hire. A plurality of simultaneous wireless communication connections is maintained between a respective plurality of vehicles in the fleet and a central control center. A plurality of messages is received at the central control center, each one of said messages including credit card transaction information. For each vehicle, the messages and said credit card transaction information are stored in the central control center in real-time or near real-time. A credit card transaction reconciliation report can be produced at any time, in response to a user request, for a motor vehicle identified in the user request. The credit card transaction reconciliation report utilizes the messages and credit card transaction information collected and stored in the central control center.

19 Claims, 10 Drawing Sheets

CREDIT CARD PROCESSING FOR A VEHICLE FLEET

FIELD OF THE INVENTION

The present invention relates generally to management of a fleet of motor vehicles. More particularly, the invention relates to the management of credit card transactions of passengers paying for fares, tolls, and other services in a fleet of motor vehicles.

BACKGROUND

The process of managing credit card transactions in a fleet of motor vehicles for hire, such as taxis and limousines, can be quite cumbersome. For example, for a taxi service that accepts passengers on the street on an ad hoc basis, the driver typically does not know the passenger in advance and must wait until the end of the trip to determine the fare and other payments that are due. The fare can vary based on information such as location, length of trip, starting or ending location at an airport, time of day, tolls, etc. It is desirable to process the transaction as quickly as possible so that the next trip can be started.

Furthermore, the credit card transactions must typically be accounted for when the driver returns the vehicle at the end of the shift. The lack of easily accessible credit card transaction information makes settlement between the driver and fleet manager difficult, and the settlement process can be quite extensive and time consuming.

It is also vitally important that the credit card transactions be made securely and quickly over a wireless communications network that may have highly varying quality. This environment has a high potential for data loss, poor reporting, and errors in the basic data for a credit card transaction. In many locations, the vehicles must offer services to unidentified passengers and if a transaction is not completed before the passenger leaves the vehicle, it may be very difficult if not impossible to recover the credit charge and there is a disadvantage that the revenue attributable to the vehicle is not maximized.

There have been recent technological advances so that, for example, the location of fleet vehicles can be determined, credit card and debit card payments can be made, and drivers can be communicated with, in real-time or near real-time. In light of the shortcomings described above, it would be advantageous to have a credit card processing system for a vehicle fleet that is different in many basic respects from conventional credit card processing methods.

BRIEF SUMMARY

The preferred embodiments of the invention involve methods, systems and software for managing the credit card transactions of a fleet of motor vehicles. In a particular aspect of the preferred embodiments, the credit card transaction information is collected from fleet vehicles in real-time over a wireless network and is securely stored at a central location. The stored credit card transaction information can be made available to a fleet manager at any time in real-time or near real-time through a standard web browser.

Because authorization and settlement are aggregated through a central control center, it is not necessary to rely on in-vehicle equipment to close shifts and send settlement records to the payment processor. The settlement processing is done completely independent of the vehicle hardware, thus reducing settlement issues and ensuring fast delivery of funds to merchant account holders.

In other aspects, the fleet management system includes a variety of fleet manager reporting features that show credit card usage patterns and other crucial business information. This helps to improve day-to-day operations and improve revenues.

In one aspect, a preferred embodiment of the invention is a method of processing credit card transactions for a fleet of motor vehicles for hire. Credit card transactions are processed and managed for a fleet of motor vehicles for hire. A plurality of simultaneous wireless communication connections is maintained between a respective plurality of vehicles in the fleet and a central control center. A plurality of messages is received at the central control center, each one of said messages including credit card transaction information. For each vehicle, the messages and said credit card transaction information are stored in the central control center in real-time or near real-time. A credit card transaction reconciliation report can be produced at any time, in response to a user request, for a motor vehicle identified in the user request. The credit card transaction reconciliation report utilizes the messages and credit card transaction information collected and stored in the central control center.

BRIEF DESCRIPTION OF THE DRAWINGS

In association with the following detailed description of the preferred embodiments, reference will now be made to the accompanying drawings, where like numerals in different figures refer to the same element, and in which:

FIG. 9 is an example of a cashiering report available to a fleet manager through the web portal in a preferred embodiment of the invention.

DETAILED DESCRIPTION OF THE PREFERRED EMBODIMENTS

Figure 1:
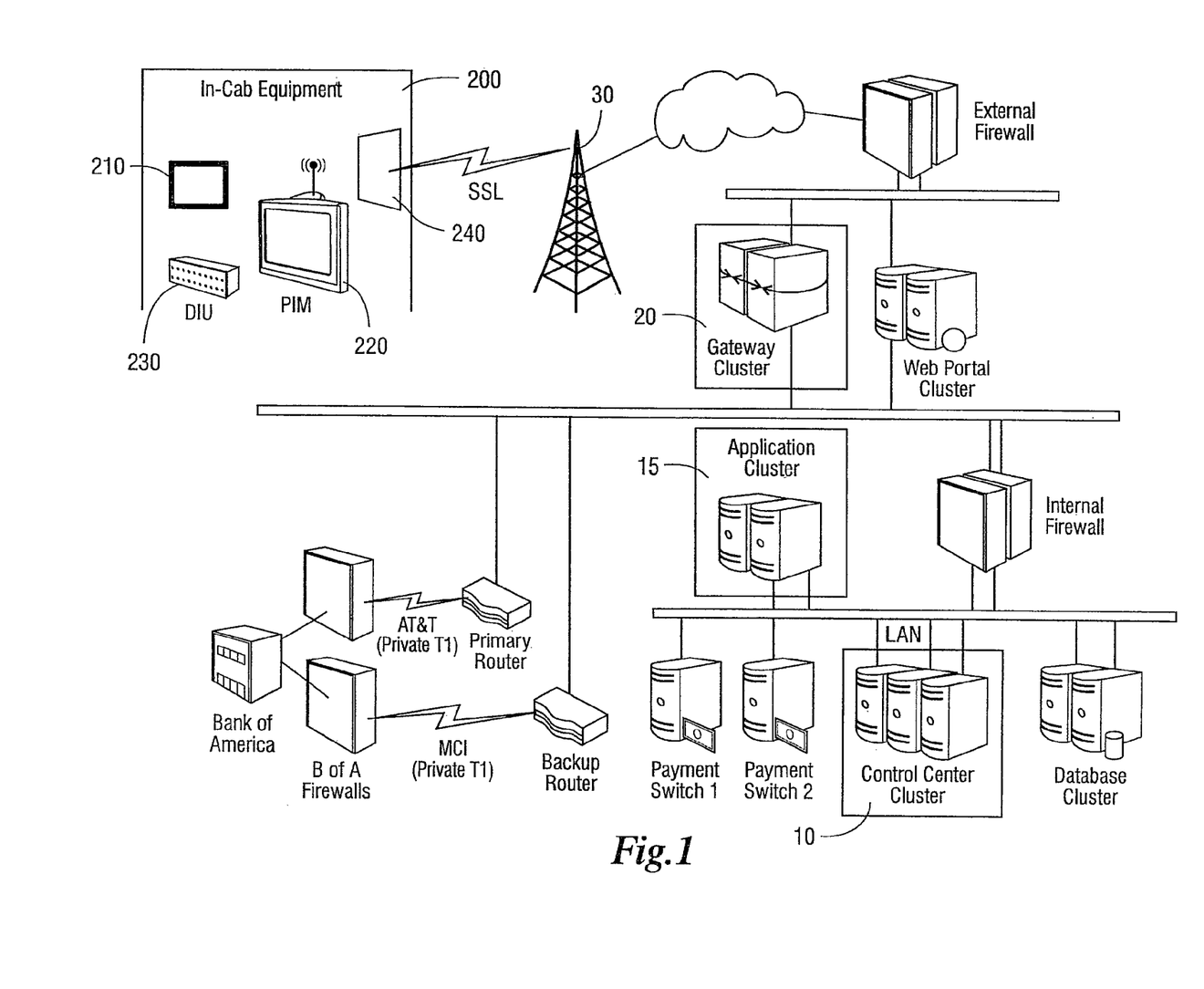
FIG. 1 is an overview of the system including basic security zones, server architecture and communication paths.

Preferred and exemplary embodiments of the present invention now will be described in detail with reference to the accompanying drawings. Referring now to FIG. 1, it shows an overall environment in conjunction with which the preferred embodiments of fleet management may be practiced. The communication system obtains and transmits a plurality of types of information to passengers in a number of vehicles. In addition to the in-vehicle components described below, the system further includes a central control center 10, a gateway 20, and a wireless service provider 30. The wireless service provider 30 is the distribution network for providing information to and from each of the vehicles 200. The wireless service provider 30, gateway 20 and the central control center 10 are configured to be able to handle a large number of simultaneous communication channels from a plurality of vehicles 200. There may also be at least one content provider (not shown), providing content to be controllably distributed to the plurality of vehicles 200.

Gateway 20 is a messaging gateway that communicates and maintains connections with each vehicle 200. Central control center 10 is the message processing application for all inbound and outbound communication with PIM 220. It must guarantee delivery of all messages to and from gateway 20, and must capture and store all messages for debugging and auditing purposes, including text messages which are delivered, undelivered, responses errors, etc. Central control center 10 only accepts messages from gateway 20 over a secure intranet or Virtual Private Network (VPN) and should reject messages from invalid sources. Central control center 10 and gateway 20 should preempt any other message for all emergency messages. Central control center 10 provides an interface to monitor health of the communication system both next to real-time and historical reporting. Monitoring data to be provided includes gateway queue sizes (in/out), central control center queue sizes (in/out), gateway connections, messages per second and total error messages.

Additionally, the system includes a locationing system whereby the geographical location of each respective vehicle 200 can be determined. The locationing system may be provided by the wireless service provider 30, or by a separate Global Positioning System (GPS), or by a combination of both. The position of each vehicle is provided to the central control center 10 in real-time or near real-time.

Furthermore, central control center 10 must capture all shift data (such as logon, logoff, power on, power off, etc.) from the vehicles, and all messages relating to shift and fares. It must also capture trip records, vehicle identification and owner identification data, trip identification and authorization limit (on-line, floor limit), vehicle status (live or out-of-service), captured batches (date, batch number, total fares, total transactions), and fare data (date, trip number, batch number, itemized fare).

In particular, the wireless service provider 30 receives the payment information from passengers, forwards it to a credit card processor, and selectively returns a verification that the payment was successfully made. The wireless service provider 30 provides a plurality of other communication functions, such as text messages and Internet access to passengers in a plurality of vehicles. Although the architecture is highly scaled and redundant, it is also designed in other ways to facilitate secure credit card processing.

Typically, a fleet vehicle 200 is equipped with a meter 210, a passenger information monitor (PIM) 220, a driver interactive unit (DIU) 230 and a wireless communication device 240. The PIM 220 is coupled to the central gateway through wireless communication device 240, and provides information to the passenger such as for example fleet logos, driver identification, and a map information. Wireless communication device 240 provides an Internet Protocol (IP) address, and performs session management and other functions to maintain an always-on connection with the wireless communication network. Further, the PIM 220 may display media content, such as advertising, to the passenger. The media content may be streamed through wireless communication device 240, stored in the vehicle 200, or any combination of the two, such as being downloaded through wireless communication device 240 and cached in vehicle 200. Optionally, meter 210 is connected to PIM 220 so as to display fare and toll information.

PIM 220 is, for example, a mobile computer comprising an integrated touch screen display recessed into a partition and directly viewable by a passenger positioned in a passenger seat, and a card reader for receiving information from a credit card or debit card. During the trip, PIM 220 allows passengers to track their journey on one of several maps with different views and to monitor tolls and surcharges. The passenger may also watch media on the touch screen display, and in some embodiments, optionally use the PIM 220 to access the Internet via wireless communication 240 and a wireless network (not shown). At the end of the trip, PIM 220 enables the passenger to pay the fare by credit card or debit card, optionally including the easy calculation of tips by interaction with the touch screen display. Preferably, the passenger interacts only with PIM 220 in the transaction and does not need to hand the credit card or debit card to the driver, and the driver never sees the credit card information, thus providing increased security.

DIU 230 allows the driver to log on and off the system by using a secure PIN. It is also the driver's primary tool for interacting with the PIM and particularly, for assisting passengers with credit card and debit card payments. It is preferably a small multi-functional box that is installed to the right side of the steering wheel in close reach and easily viewable from the driver's seat. It features easy to use buttons that correspond to various responses that appear on the screen—depending upon the action that is currently taking place in the vehicle. For example, the driver may facilitate payment transactions by selecting the buttons that correspond to simple responses like "yes" and "no" in response to questions like "are all amounts entered correct?"

DIU 230 is optionally coupled to other devices for displaying messages and may display messages from the fleet manager and, optionally, governmental agencies. Some text messages require no responses and others will prompt the driver to respond using pre-set responses on DIU 230. Pre-defined text messages can also be sent from the driver to the fleet.

Although not shown in FIG. 1, a content provider, such as an advertiser or media distributor, may provide content to be made available for display on PIM 220. The content provider may provide media content, as for example advertisement images and/or text, as well as instructions for distribution of the content. For example, the media content may be shown during a specified time period or when a vehicle enters a specified geographical area. Alternatively, the content provider may not provide the actual content, but instead provides a link to content, such as a website on the World Wide Web (WWW) which is displayed on PIM 220 in a similar manner as other content. There may be information recorded in central control center 10 indicating the number of vehicles and/or time that content has been played. In some embodiment(s), the passenger may have the ability to override the display of the media content, and the system preferably records the approximate amount of time that content is displayed to passengers.

The fleet management is broken into several application components. A customer facing component runs on the PIM 220. The gateway and central control center application components work in tandem to service all messages to and from PIM 220. These messages include trip sheet data, credit card processing messages and AVL messages for spatial queries. Additionally, the central control center 10 utilizes payment processing switches to facilitate secure, reliable credit card processing. Finally, Web Portal and Shared Services application components are used to display and report on all captured data within the system.

Gateway

The gateway application component is a multi-threaded IP socket-based listener which accepts and maintains persistent connections with PIMs 220. Once a socket connection has been established, the gateway 20 is responsible for storing and forwarding all messages both to and from the PIM 220. The gateway 20 preferably guarantees delivery of messages and employs a message queuing technique similar to that of an SMTP mail server.

The gateway 20 also monitors the connection status of PIMs 220 and forwards messages to the central control center 10 based on those connections. This constant monitoring ensures that the central control center 10 knows which PIM 220 is connected to which gateway 20 for proper outbound message delivery. If the gateway 20 sees that a socket connection has been terminated or that it's been inactive for an extended period of time, it will tear down the socket connection and notify the central control center 10.

Figure 2:
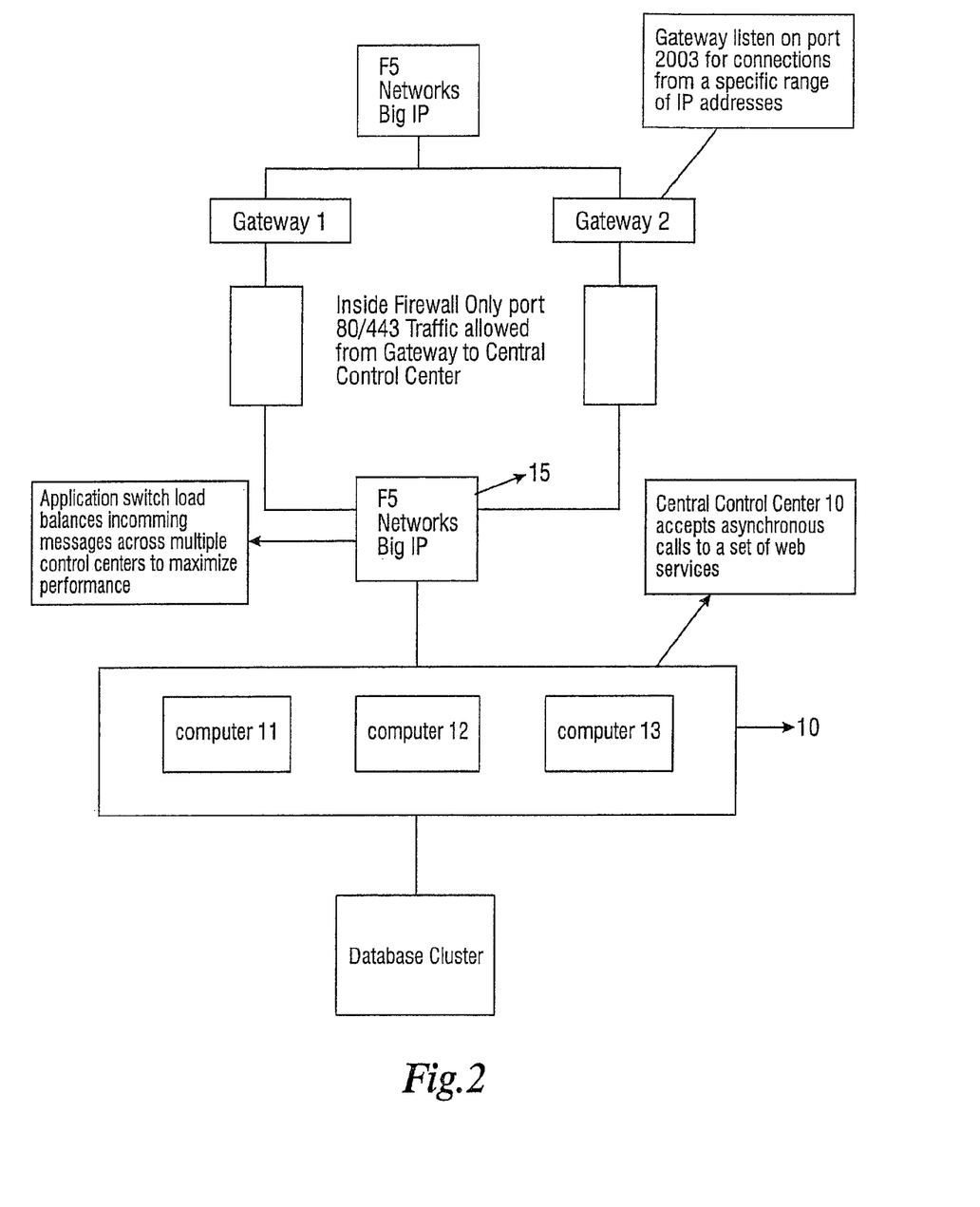
FIG. 2 is a diagram of how a central control center interacts with a Gateway and a database cluster in a preferred embodiment of the invention.

The gateway 20 is preferably fronted by application switches 15 as shown in FIG. 2, such as the BigIP Application Switch commercially available from F5 Networks of Seattle Wash. The application switches 15 load balance gateways 20 and ensure maximum uptime. Although multiple gateways 20 are present, to each one of the PIMs 220, only one gateway 20 is visible. This gateway 20 exists as a virtual IP Address on the redundant pair of application switches 15. The application switches 15 determine (based on current loads), which gateway 20 will be used to service requests from PIMs 220. This design allows the fleet management system to quickly and easily bring up more gateways 20 as traffic increases. Additionally, gateways 20 can be brought offline and upgraded with no service interruption.

Central Control Center

FIG. 2 shows a high level overview of how the central control center 10 interacts with the gateway 20 and the database cluster. The central control center 10 is comprised of a cluster of computers 11, 12 and 13. All messages from the gateway 20 are packaged as SOAP messages and forwarded to the application switches 15. Once received at the application switches 15, the application switches 15 will determine which computer 11 is currently processing the least number of messages and send the message to computers 11, 12 and 13. Once the message is received, the computer 11 will determine the message type, decode it and process the message. If the message requires a response or the message was initiated internally, the computer 11 will send a message to PIM 220 through the gateway 20 which holds its connection. This communication is possible because of a routing table kept by the gateway. If the message is undeliverable, the central control center 10 will try to resend the message once the routing table has been updated and the PIM 220 connected.

The central control center (10) is preferably implemented as a series of web services which enable high levels of scalability through standard application switching techniques. Also by using application switches, individual computers 11, 12 and 13 can be taken off line and serviced while the entire solution is still fully functional. This is made possible by using one more server than is necessary to service the maximum traffic. Additional computers can be introduced quickly and efficiently as needed based on traffic.

Payment Processing

Conventionally, each vehicle processes the credit cards of passengers and acts as its own merchant of record. However, this has numerous disadvantages, not the least of which is the difficulty of a fleet manager in managing the credit card transactions. Instead, each PIM 220 does not act as an individual Point of Sale (POS) device sending transactions directly to the processor for authorization and settlement in the preferred embodiments. Rather, all transactions are aggregated in the central control center 10 and are sent through the payment processing switch. In this design, the central control center is acting as the Point of Sale device controlling the authorization and settlement (capture) of credit card transactions. In this way, there can be a variety of different merchant accounts—either one merchant account for the entire fleet; respective merchant accounts for groups of vehicles; or a merchant account for a particular vehicle or driver. But the merchant accounts are configurable or controllable through the web portal without having to change the apparatus in the car. The payment processing system is preferably different than the conventional payment processing system, with stronger security and compliance in mind. It is the most secure, robust, payment processing system for the wireless environment. It uses a PCI standards compliant, 3rd party payment switch to ensure maximum uptime and security while simultaneously providing the flexibility to move to different back-end processors if necessary. A Payment Processing Switch such as that commercially available from ISD Corporation of Irving Tex., routes all payment transactions to the appropriate clearing house for authorization and settlement. This PCI compliant switch is installed on multiple servers for failover and redundancy. The central control center 10 identifies a payment switch failure and automatically routes authorization and settlement requests to the appropriate server. Additionally, redundant payment routers sit on the network and connect to redundant payment processor gateways at our current payment processor.

Figure 3:
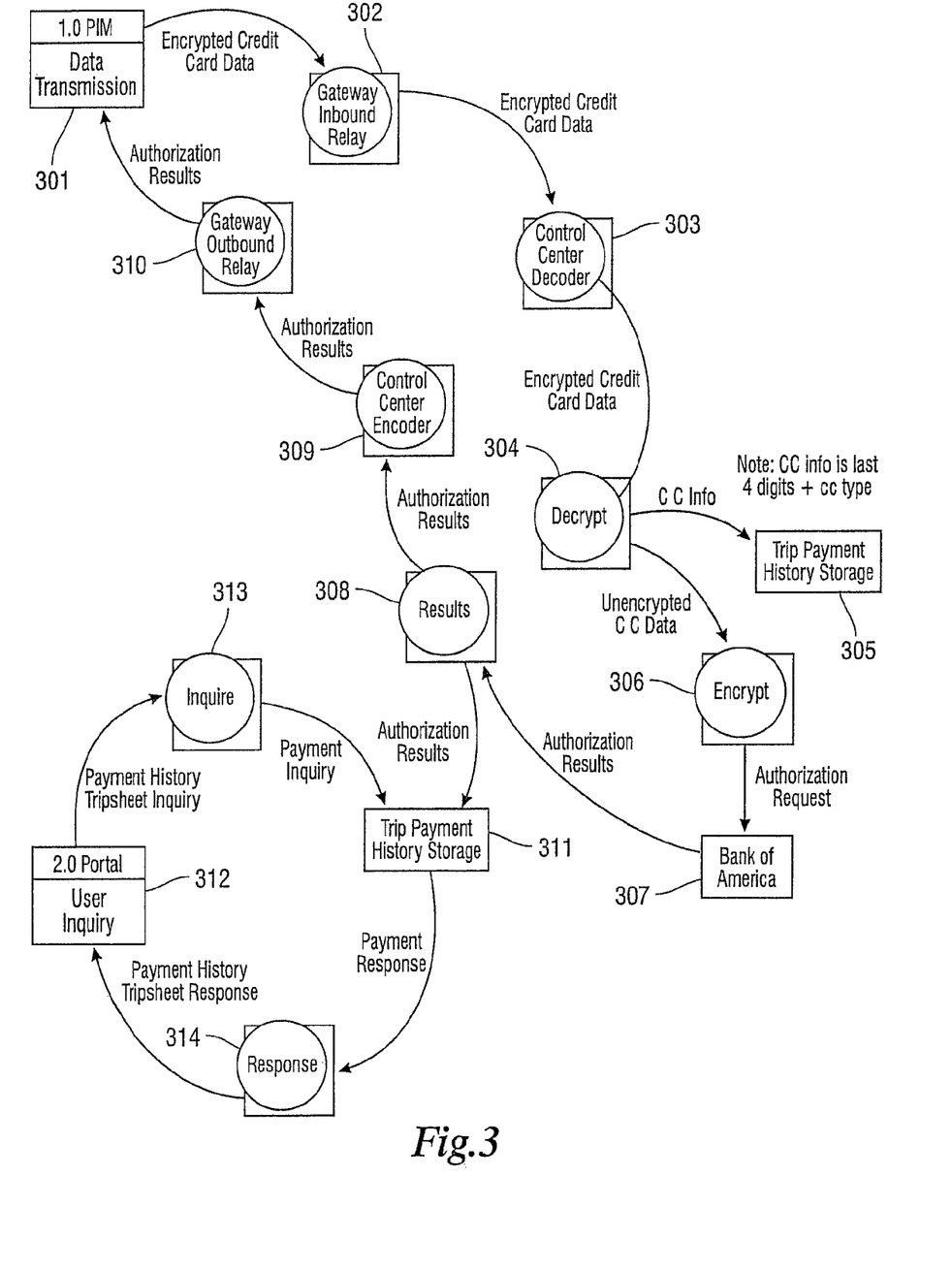
FIG. 3 shows how data flows for credit card processing in a preferred embodiment of the invention.

FIG. 3 shows how data flows for credit card processing from PIM 220 through the gateway to the central control center 10 and back. When the passenger swipes their credit card at PIM 220 (301), the encrypted credit card information is sent electronically through the gateway 20 (302) and to payment switches in central control center 10 (303). At the payment switches, the credit card data is decrypted for the first time (304). The last 4 digits are separated out and saved in trip payment history storage (305). At the payment switches, the credit card data is again encrypted (306) and a secure authorization request is made to a payment processor, such as Bank of America (307) shown on the left of FIG. 1. The credit card approval or decline results from the authorization request (308) are provided by the payment processor. These authorization results are promptly transmitted back to the vehicle through the central control center encoder (309) and the gateway (310). The authorization results are displayed to the passenger on PIM 220 and to the driver on DIU 230 within a matter of seconds. In this way, the passenger can leave the vehicle with a minimum delay. The authorization results are also stored (311) for subsequent payment processing so that a subsequent payment can be made and associated with a trip. Subsequently, a fleet manager may make an inquiry at the web portal (312), and the central control center 10 formulates an inquiry (313) for the appropriate payment and associated trip sheet information stored in the database. The payment information in the database is included in a payment response (314) and then formulated as a response to the fleet manager's request for a payment history/trip sheet. FIG. 9 is an example of a cashiering report available to a fleet manager through the web portal in a preferred embodiment of the invention to facilitate the prompt payout to drivers at the end of a recently completed shift. Information on all trips conducted in a vehicle by a driver are organized and summarized by a driver's shift (as defined by log on/off of the vehicle equipment).

Figure 4A:
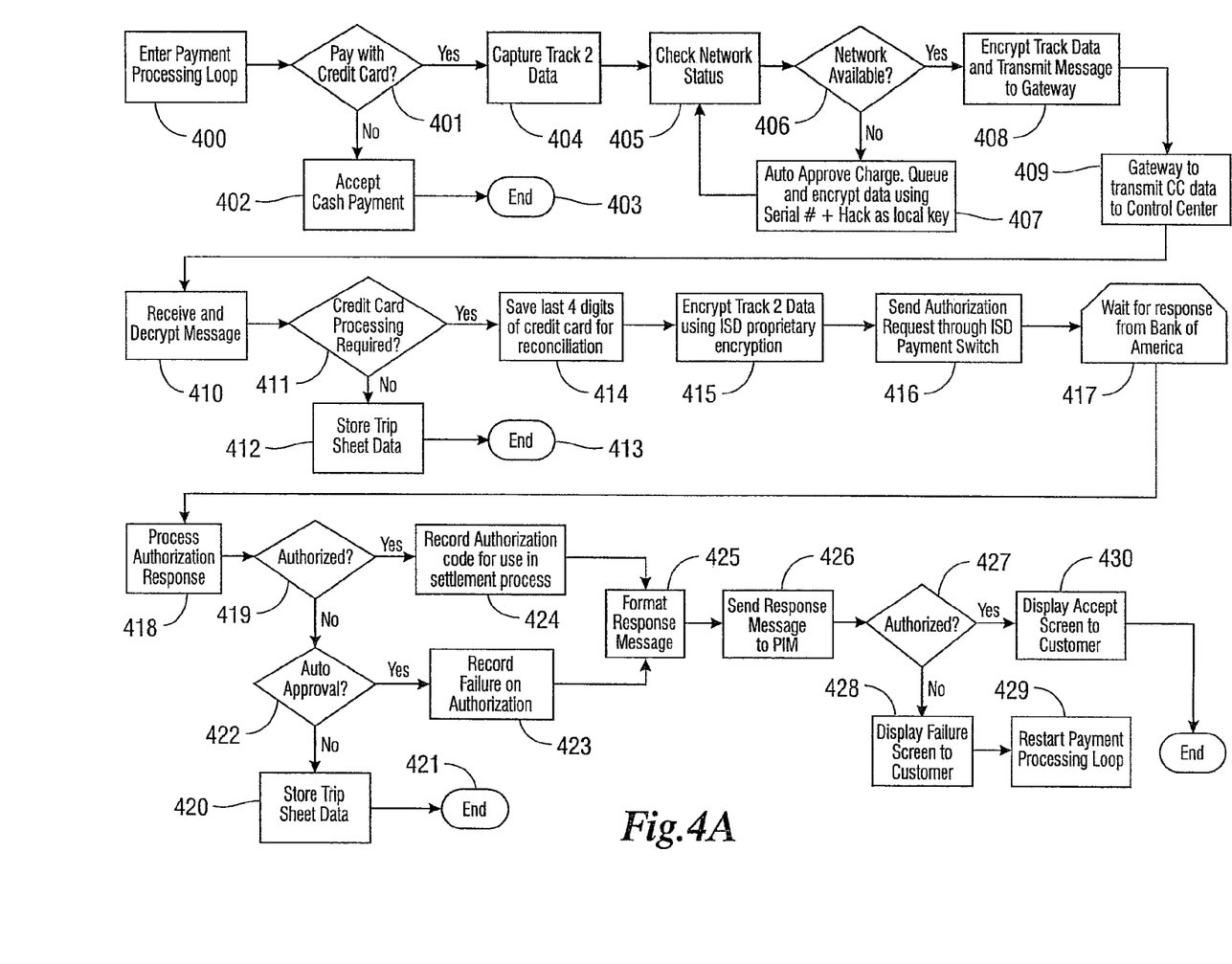
FIG. 4A is a flowchart of the authorization process in the preferred embodiment of credit card processing.

FIG. 4A is a flowchart of the payment transaction authorization process. It starts (401) with a passenger choosing whether or not to pay with cash (402), and they indicate as such on PIM 220 and the process ends (403). If not, they swipe their credit card, and the information on the card is captured (404). The vehicle then checks the network status (405) to determine if the vehicle is in a dead zone (406) of the wireless communications network. If it is in a dead zone, then the payment is automatically approved. The data is queued for when the network is available and encrypted using an encryption key stored in PIM 220 (407). Otherwise, the credit card data is encrypted and transmitted to gateway 20 (408), and to central control center 10 (409), which receives and decrypts the message (410). If credit card processing is not required (411), then only trip sheet data is stored (412) and the process ends (413). Otherwise, the last 4 digits of the credit card are saved for reconciliation (414). The complete credit card data is re-encrypted at the payment switch (415), preferably utilizing the assignment of a unique identifier that will propagate through the payment records as the payments are authorized, settled, and reconciled. The authorization request is sent through the payment switch (416) to the payment processor, and then there is a wait for the authorization response (417). The authorization response is processed (418) and it is determined if it is authorized (419). If it is not authorized, and is auto approved (because in a dead zone) then it is nevertheless recorded (420), then the process ends (421). If it is not authorized and not auto approved (422), then the authorization failure is recorded (423). If the transaction is authorized, the code is recorded for use in the settlement process (424). Either the authorization code or the failure notice is included in a formatted response message (425) which is sent to PIM 220 (426). If not authorized (427), a failure screen (428) is displayed to the customer and the passenger is prompted to restart the process (429). If authorized, an accept screen (430) is displayed and the process ends.

The central control center 10 controls the flow of data (as a typical POS device would) by encrypting the message into an ISO 8583 compliant structure and sending the request through the payment processing switch to the appropriate authorizer. This design offers a highly flexible payment processing engine while at the same time giving the ability to add additional levels of security to the overall solution. This flexibility allows a higher level of fraud protection to be implemented in the future by analyzing data flow trends and better identifying high risk scenarios.

Additionally, by aggregating transactions through the central control center, there is better control over the flow of settlement records and it is not necessary to rely on the availability of the in cab equipment (PIM 220) to close and settle credit card batches (see settlement description below). The credit card reconciliation process is also enhanced by aggregating transactions through the central control center and providing updates to merchant account holders as to when credit card transactions actually settle.

Figure 4B:
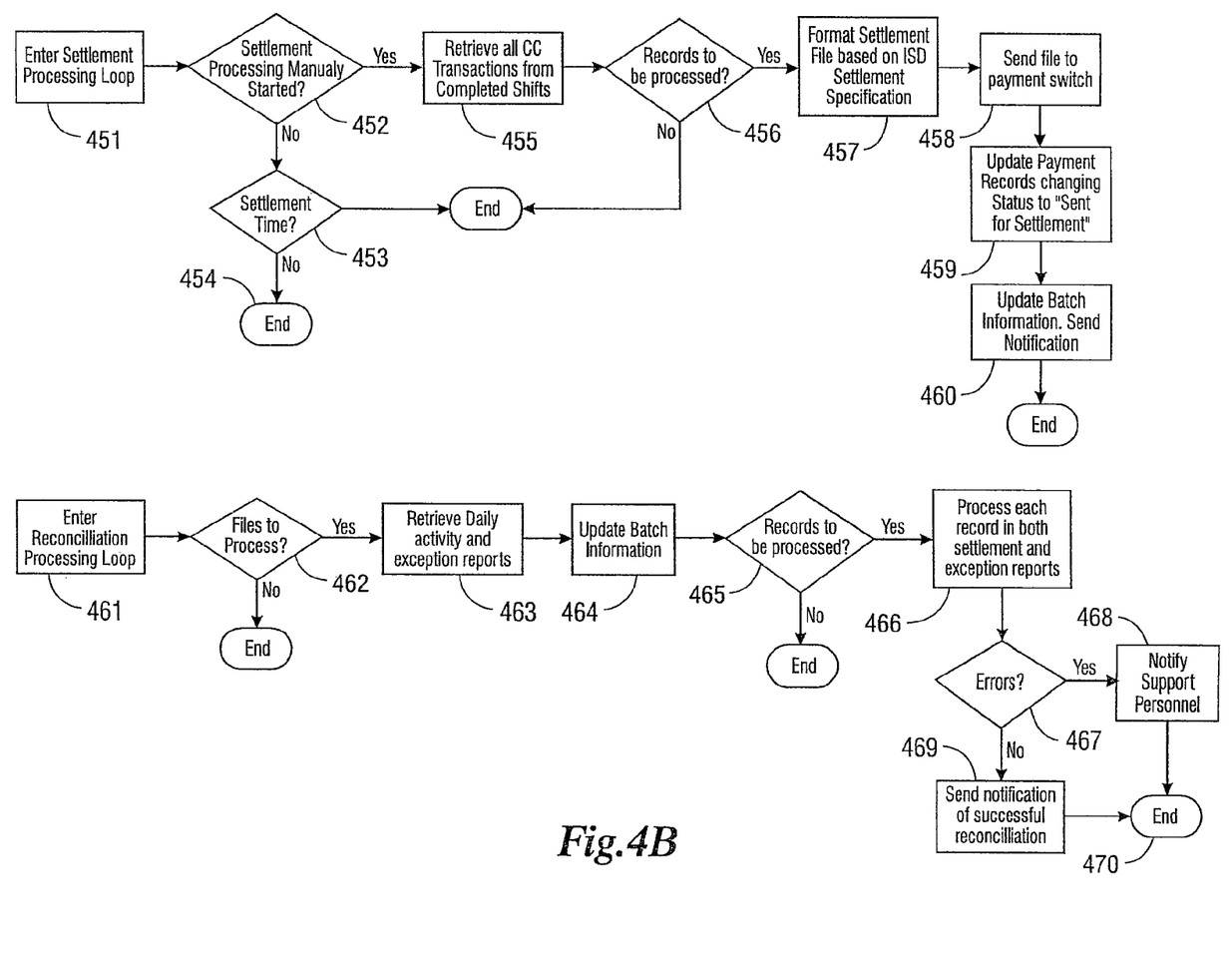
FIG. 4B is a flowchart of the settlement and reconciliation process in the preferred embodiment of credit card processing.

FIG. 4B is a flowchart of the settlement and reconciliation process, which is entered (451) after authorization. Most payment processors do settlement and reconciliation overnight on business days only. The process ends (454) if it is not manually started (452) by a settlement time (453). If it is manually started, all the credit card transactions are retrieved from completed driver shifts (455), and unless there are no records to be processed (456), a settlement file is formatted (457) and sent to the payment switch (458). The payment records are updated as being "Sent to Settlement" (459). Batch information is updated and notification is sent (460). The reconciliation process starts (461) if there are files to process (462). If so, the daily activity and exception reports are retrieved (463). These reports preferably include the unique identifier assigned during the re-encryption step 415 in FIG. 4A. The batch information is updated (464) and, if there are records to be processed (465), each record in the settlement and exception reports is processed (466). If there are errors (467), then support personnel are notified (468). If not, then notification of successful reconciliation is sent (469) before the reconciliation process ends (470).

The settlement process maximizes the number of transactions sent for settlement to facilitate getting batch deposits to merchants as quickly as possible. In order to meet these requirements, it is a flexible settlement system which allows for settlement at any time of the day or any reason (completing shifts, time elapsed, etc. . . . ) However, financial institutions typically process settlement records once each day. A backend processing service, such as that commercially available from Bank of America of Charlotte, N.C., processes records for settlement at a particular time of day, such as 6:00 pm EST. This means that regardless of when settlement files are sent, they are only processed at the designated time. For this reason, a settlement file is only sent once a day slightly before the designated time. By only sending one file, there is greater control over the process and the delivery and proper processing of the settlement file can be better ensured.

The settlement is constructed from all credit card authorizations on completed shifts up to the time the settlement file is sent. Once the file has been confirmed delivered, all records are updated to a "Sent for Processing" status. Once the batch has been processed, the processor creates an Activity Report and an Exception report to indicate the success or failure of records. All records in the system are updated with the status in these reports. Exceptions are logged and support personnel are notified.

Because authorization and settlement are aggregated through the central control center 10 and payment processing switch, it is not necessary to rely on in-vehicle equipment to close shifts and send settlement records to the payment processor. The settlement processing is done completely independent of the vehicle hardware, thus reducing settlement issues and ensuring fast delivery of funds to merchant account holders.

Portal Architecture

Figure 5:
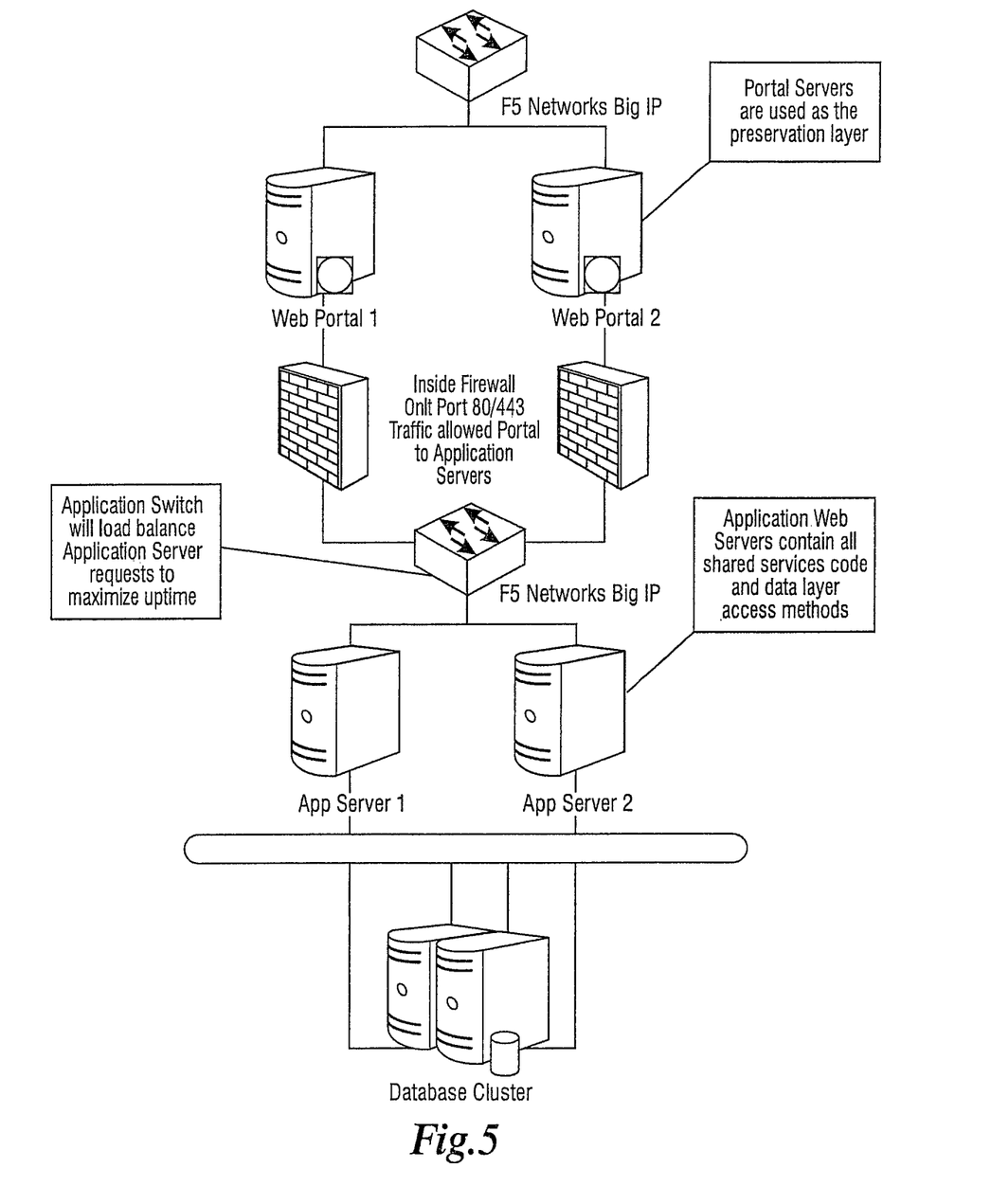
FIG. 5 is a diagram of the architecture of a web portal in a preferred embodiment of the invention.

FIG. 5 shows a preferred portal architecture. The portal is a secure web based application which allows users to view all aspects of the solution including trip sheet data, text messages, payment processing status, last known vehicle location and more. All user access is through the Web Portal, which is made secure through SSL (https). It is a multi-tier application utilizing ASP.NET 2.0 as its presentation layer, a series of web services which wrap the business logic and a separate data layer which encapsulates all data access through stored procedures User interface elements are based on a control suite, such as the NetAdvantage control suite commercially available from Infragistic of Princeton, N.J. which ensures a high level of functionality while minimizing control defects. This control suite affords rich functionality for end users to manipulate and analyze data.

A key aspect of the web portal is that there is a set of standard business objects, which encapsulate the core business logic. By separating business logic from data access and user interface functions, the service offering can be expanded through externally facing web services without the need to reengineer backend services.

Figure 6:
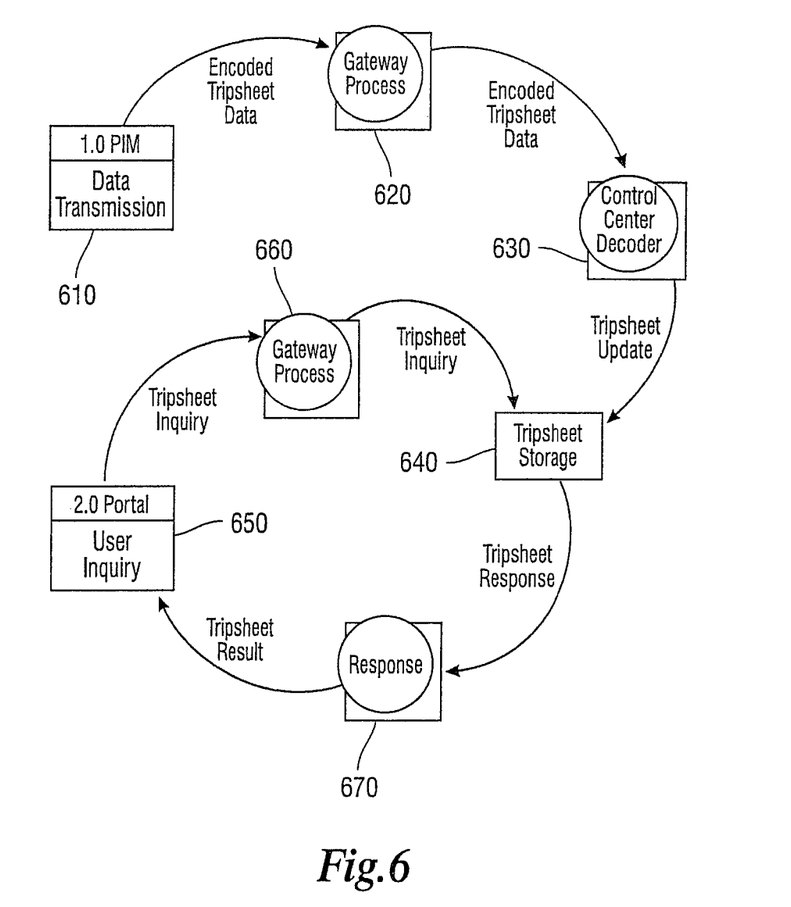
FIG. 6 is an example of the data flow for a trip sheet from a PIM to a communications gateway and to a central control center and back in a preferred embodiment of the invention.

FIG. 6 shows a single data flow of data for an electronic trip sheet from the PIM 220 through the gateway 20 to the central control center 10 and back. The beginning step 610 of the process is the transmission of electronic trip sheet data from the vehicle to the gateway 20. This step 610 occurs whenever data is desired to be saved, for example, power on/off, driver log on/off, beginning and ending of a trip, passenger status, meter status, etc. at a number of different times. The application data is preferably encoded into a special to provide an extra level of security. Even if someone attempts to intercept the data, such as by pretending to be the receiving gateway, the data will be encoded and hard to use even if obtained. At step 620, gateway 20 receives the encoded trip sheet data, managing the communication session as indicated above, and passes the encoded trip sheet data onto central control center 10. At step 630, the central control center 10 decodes the trip sheet data and stores it at step 640. The data from this transmission and many other trip sheets is stored in its raw form, and is not organized at this point in time in the format that may later be used for a report. When a fleet manager makes an inquiry on the web portal at step 650, a trip sheet inquiry is created. This inquiry is processed at step 660 by the application cluster in central control center 10 and forwarded on to obtain the requisite data related to the inquiry stored at database in step 640. A trip sheet response containing the data to be utilized is returned to central control center 10 at step 670. Central control center 10 generates a trip sheet result and sends it to web portal, which displays it to the fleet manager. The data is not formatted in the trip sheet result sent from step 670. It is the web portal at step 650 that formats the data in the trip sheet result and generates the electronic trip sheet report.

Figure 7:
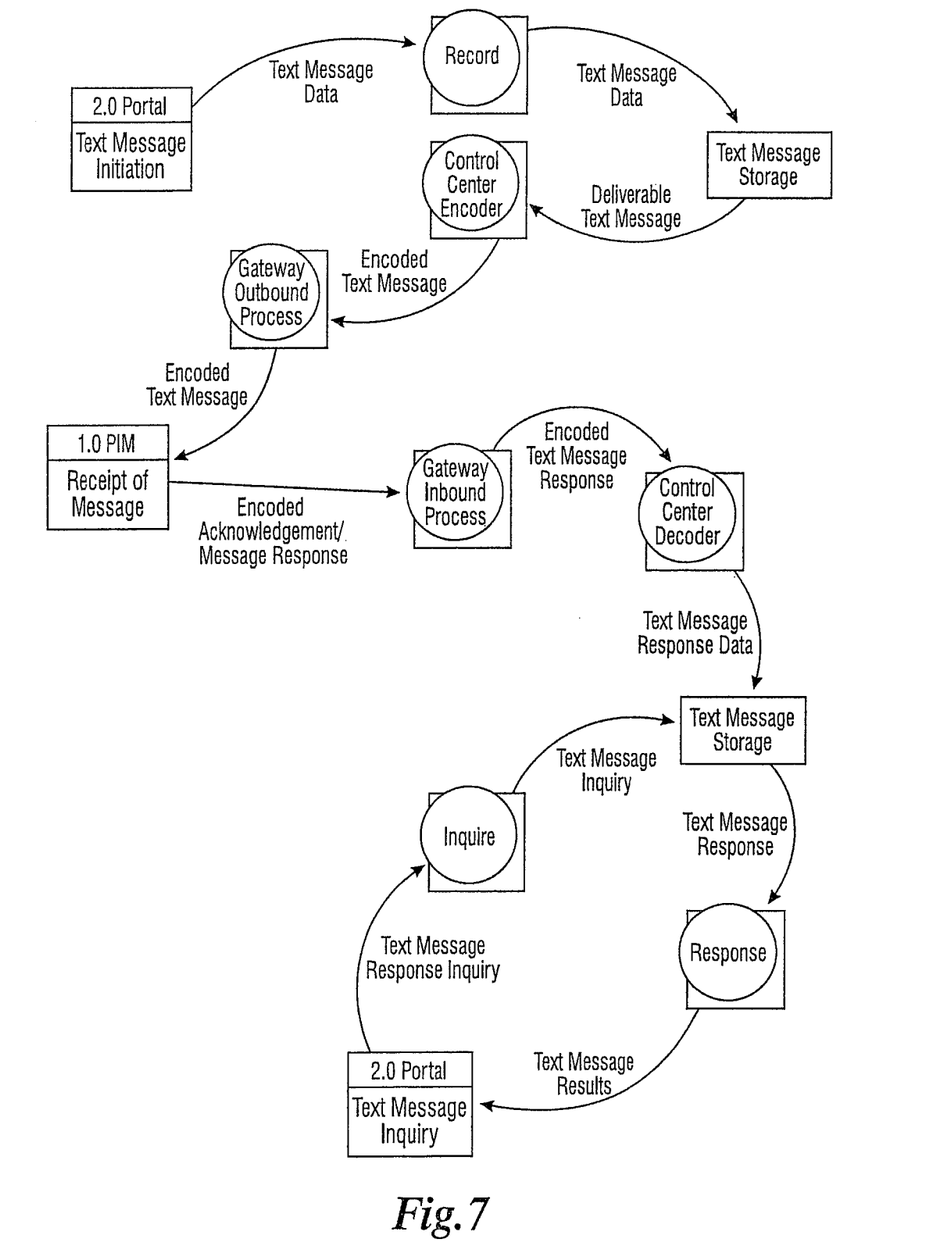
FIG. 7 is an example of the data flow for text messaging in a preferred embodiment of the invention.

FIG. 7 shows how data flows for text messaging to and from the PIM 220 through the gateway 20 to the central control center 10 and back. Text messages can be delivered to individual vehicles or groups of vehicles through the web based portal. Once the messages are constructed and the recipients selected, the text message will attempt to be queued and delivered via the central control center for a configurable amount of time. This timeout period is configurable via the web portal and is set on per-message bases. The timeout period ranges from 6 to 48 hours and if the message is not delivered in this timeframe, the message(s) expires and are permanently archived.

Database Design and Implementation

The database is a highly scalable and highly available clustered database solution utilizing scalable hardware, such as the 6850 server hardware available from Dell Corporation of Round Rock, Tex. It has great flexibility with regards to expansion, and additional shelves of drives can be added at any time to expand the current databases. A redundant multi-path, multi-device architecture is utilized which can withstand a failure of any one device, disk or switch. Physical storage is provided by a storage area network (SAN), commercially available from EMC Corporation of Hopkinton, Mass. and others.

A preferred embodiment utilizes the Microsoft SQL Server 2005 as the database application. Microsoft SQL Server 2005 uses a variation of SQL called Transact-SQL which is based on the ISO SQL-92 standard. Microsoft SQL Server also has native support for ODBC and XML. Other database applications supporting these features may also be used.

Database and Disk Sizing

Customized databases are created specifically based on the usage, transactional volume and the overall storage requirements necessary to store all necessary data elements. The chart below outlines the databases, descriptions, estimated transaction volumes and the overall size for a fleet of 5,000 vehicles. Additionally, the number of drives selected is a result of the highly transactional nature of the fleet management.

| Database Name | Description | Est. Daily Volume | Est. Size Needed after 9 mo. |
|---|---|---|---|
| Profile | Houses information about users, fleets, vehicles, etc.. | 200,000 transactions | 100,000 MB |
| central control center | Houses status information about gateways, pims and their relationship | 400,000 transactions | 2,000 MB |
| transaction | Houses current trip sheet data, vehicle location information and other transactional information | 5,300,000 transactions | 100,000 MB |
| transaction6m | Houses historical trip sheet data after shifts and trips have been closed and settled | 400,000 transactions | 900,000 MB |
| Totals | | 6,300,000 transactions | 1402,000 MB |

In order to accommodate the large amount of data, an extensible SAN is preferably used, such as the CX300 available from EMC Corporation of CITY, STATE. It is configured with multiple SCSI Drives, with additional drive shelves easily added to expand storage as the data grows. Current drive volumes should be able to be extended without service interruption. The data is archived to tape in a manner so as to be recalled on an as needed basis for ad hoc SQL queries.

Figure 8:
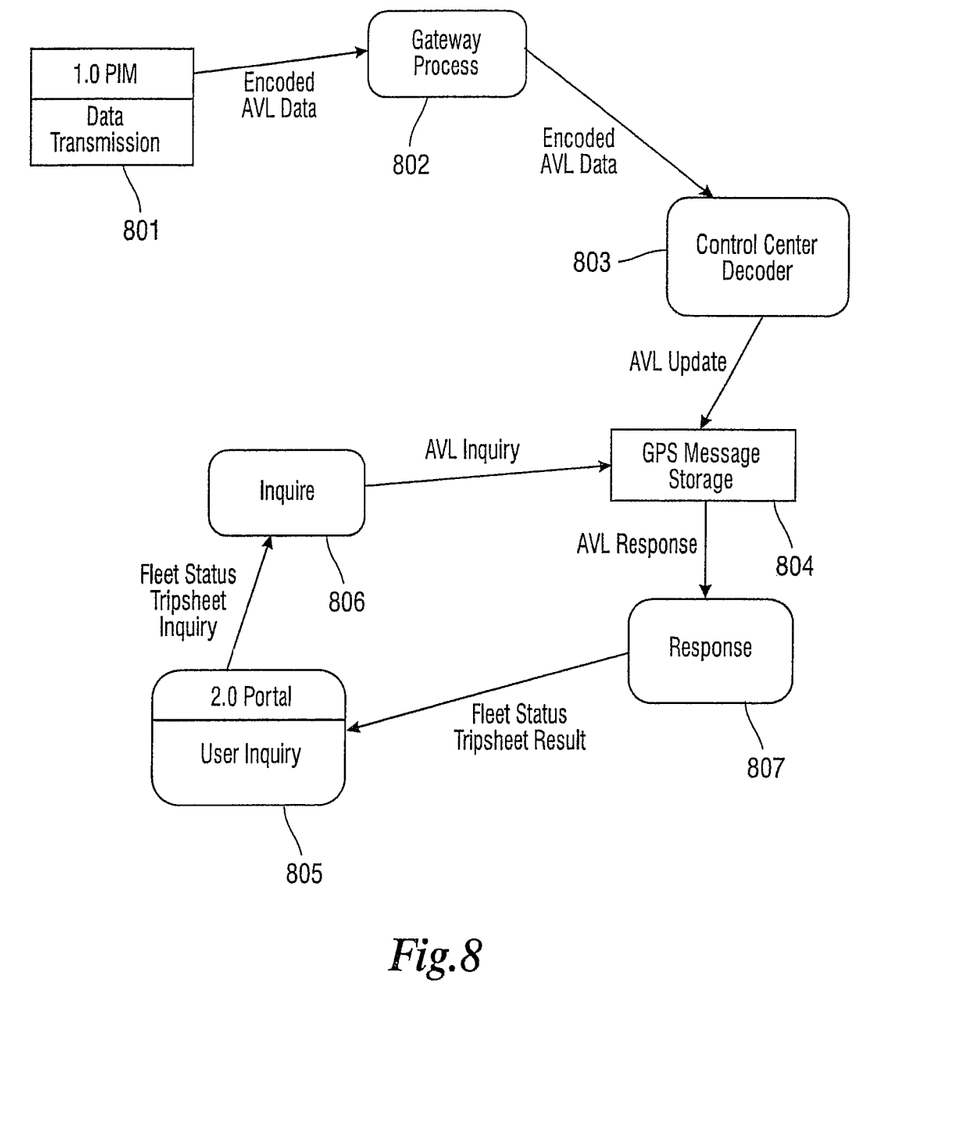
FIG. 8 is an example of the data flow for AVL in a preferred embodiment of the invention.

FIG. 8 shows how data for the automobile vehicle location (AVL) information flows from the PIM 220 through the gateway to the central control center and back. Every event that results in trip sheet data as shown in FIG. 6 also includes AVL information. In addition to those events, there are also frequent periodic AVL messages, each one of which contains AVL information for its respective point in time. The AVL messages are frequent enough to keep the wireless communication device 240 maintained in a communication session with gateway 20 through the wireless communication network. In this way, when a message is to be sent by the vehicle, it does not need to establish a communication session and the message can be sent without delay. Gateway 20 also monitors the communication session in this way, knowing that if a message hasn't been received in a certain period of time, the session has been lost and it has to establish a new communication session. This results in a unique bi-directional method of communication session control optimized for ensuring consistent receipt of AVL information.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of processing credit card transactions for a fleet of motor vehicles for hire, comprising:

maintaining a plurality of simultaneous wireless communication connections between a respective plurality of vehicles in a fleet and a central control center;

through the plurality of wireless communication connections, receiving a plurality of messages for said plurality of vehicles at said central control center, the plurality of messages including credit card transaction information; and collecting said plurality of messages and said credit card transaction information from said plurality of vehicles and storing said plurality of messages and said credit card transaction information in said central control center in real-time or near real-time;

aggregating said credit card transaction information at said central control center for the plurality of vehicles;

assigning a merchant information at said central control center to said credit card transaction information, the merchant information including a driver, a vehicle, groups of vehicles or a fleet of vehicle information that corresponds to the credit card transaction information; and controlling authorization and settlement of the credit card transactions at the central control center based on said credit card transaction information received from said plurality of vehicles and said merchant information assigned at said central control center.

2. The method of claim 1, wherein the motor vehicle has a charging meter that determines the amounts of the credit card transactions, a passenger information module (PIM) containing a credit card reader, and a driver interactive unit.

3. The method of claim 2, wherein the central control center provides a control message over said simultaneous wireless communication connection after the credit card transaction information is collected and stored, and before the settlement of said credit card transactions with a credit card processing service.

4. The method of claim 3, wherein the control message is displayed on the driver interactive unit to indicate to the driver that the passenger can leave the vehicle.

5. The method of claim 1, wherein credit card transactions are settled in batches.

6. The method of claim 5, further including providing a credit card transaction reconciliation report that includes information necessary for reconciling payments during a driver's shift.

7. A fleet management central control center, central the control center comprising:

a communication gateway, said communication gateway being adapted to maintain a plurality of simultaneous wireless communication connections with a respective plurality of vehicles in a fleet and to receive a plurality of messages at said central control center said messages including credit card transaction information;

a database, for the plurality of vehicles, collecting and storing said plurality of messages and said credit card transaction information in real-time or near real-time; and at least one control center computer programmed to aggregate said credit card transaction information at said central control center for the plurality of vehicles, assign a merchant information at said central control center to said credit card transaction information, the merchant information including a driver, a vehicle, groups of vehicles or a fleet of vehicle information that corresponds to the credit card transaction information; and control authorization and settlement of the credit card transactions at the central control center based on said credit card transaction information received from said plurality of vehicles and said merchant information assigned at said central control center.

8. The central control center of claim 7, wherein the motor vehicle has a passenger information module (PIM) containing a credit card reader and a driver interactive unit.

9. The central control center of claim 8, wherein the central control center provides a control message over said simultaneous wireless communication connection after the credit card transaction information is collected and stored, and before the settlement of said credit card transaction with a credit card processing service.

10. The central control center of claim 9, wherein the control message is displayed on the driver interactive unit to indicate to the driver that the passenger can leave the vehicle.

11. The central control center of claim 7, wherein said credit card transaction are settled in batches.

12. The central control center of claim 11, further including a credit card transaction reconciliation report includes information necessary for reconciling payments between the fleet manager and a driver at the end of a shift.

13. A software program product recorded on a tangible medium, said software product, when executed by at least one computer, causes said at least one computer to carry out functions utilizing credit card transaction information in a motor vehicle fleet, said functions comprising:

maintaining a plurality of simultaneous wireless communication connections between a respective plurality of vehicles in a fleet and a central control center;

receiving credit card transaction information at said central control center from the plurality of vehicles; and collecting and storing said plurality of messages and said credit card transaction information in said central control center in real-time or near real-time;

aggregating said credit card transaction information at said central control center for the plurality of vehicles;

assigning a merchant information at said central control center to said credit card transaction information, the merchant information including a driver, a vehicle, groups of vehicles or a fleet of vehicle information that corresponds to the credit card transaction information; and controlling authorization and settlement of the credit card transactions at the central control center based on said credit card transaction information received from said plurality of vehicles and said merchant information assigned at said central control center.

14. The software of claim 13, wherein said central control center acts as the point-of-sale device controlling the authorization and settlement of said credit card transactions.

15. The software of claim 14, wherein the motor vehicle has a passenger information module (PIM) containing a credit card reader and a driver interactive unit.

16. The software of claim 15, wherein the central control center provides a control message over said wireless communication connection after the credit card transaction information is collected and stored, and before the settlement of said credit card transaction with a credit card processing service.

17. The software of claim 16, wherein the control message is displayed on the driver interactive unit to indicate to the driver that the passenger can leave the vehicle.

18. The software of claim 14, wherein a batch of credit card transaction are settled at a time selected by a fleet manager.

19. The software of claim 18, further including a credit card transaction reconciliation report includes information necessary for reconciling payments between the fleet manager and a driver at the end of a shift.

* * * * *